United States Patent [19]

Takeshima

[11] Patent Number: 5,017,538
[45] Date of Patent: May 21, 1991

[54] CATALYST FOR PURIFYING EXHAUST GAS AND A METHOD OF PRODUCING THE SAME

[75] Inventor: Shinichi Takeshima, Shizuoka, Japan

[73] Assignee: Toyota Jidosha Kabushiki Kaisha, Japan

[21] Appl. No.: 339,838

[22] Filed: Apr. 18, 1989

[30] Foreign Application Priority Data

Apr. 18, 1988 [JP] Japan .................................. 63-95026

[51] Int. Cl.$^5$ .............................................. B01J 29/30
[52] U.S. Cl. ........................................ 502/64; 502/60; 502/71
[58] Field of Search ..................... 502/60, 64, 71; 423/213.2

[56] References Cited

U.S. PATENT DOCUMENTS

| | | | |
|---|---|---|---|
| 4,297,328 | 10/1981 | Ritscher et al. | 423/213.2 |
| 4,331,644 | 5/1982 | Ritscher | 423/213.2 |

FOREIGN PATENT DOCUMENTS

| | | |
|---|---|---|
| 60-125250 | 7/1985 | Japan . |
| 61-11147 | 1/1986 | Japan . |
| 291258 | 9/1987 | Japan . |
| 63-100919 | 5/1988 | Japan . |

*Primary Examiner*—Carl F. Dees
*Attorney, Agent, or Firm*—Finnegan, Henderson, Farabow, Garrett & Dunner

[57] ABSTRACT

In a catalyst for purifying exhaust gas which comprises zeolite carried on a refractory support and containing copper introduced thereinto by ion exchange, the zeolite has each site of ion exchange located on the surface of its supercage, and a square arrangement of four oxygen atoms around a copper ion. A method of producing the catalyst is also disclosed. Zeolite is dipped in a copper carboxylate solution to cause the ion exchange to take place. It is possible to obtain a catalyst having a high power of removing $NO_x$ from exhaust gas if the diameter of the supercage of zeolite is appropriately selected in accordance with the size of HC molecules which the exhaust gas contains.

9 Claims, 4 Drawing Sheets

- Al
○ Si
◎ Na(SI)
● Na(SII)
⊖ Na(SI)

CATALYST FOR PURIFYING EXHAUST GAS AND A METHOD OF PRODUCING THE SAME

BACKGROUND OF THE INVENTION

1. Field of the Invention

This invention relates to a catalyst for purifying the exhaust gas of an automobile. More particularly, it is a catalyst which can remove $NO_x$ very effectively from even the combustion product of a lean fuel mixture containing an excess of oxygen. It also relates to a method of producing such a catalyst.

2. Description of the Prior Art

The catalysts which can oxidize carbon monoxide (CO) and hydrocarbons (HC) and reduce nitrogen oxides ($NO_x$) simultaneously are widely used for purifying the exhaust gases of automobiles. These catalysts basically comprise a support formed from a refractory material, such as cordierite, and carrying a coated and baked layer of a slurry of $\gamma$-alumina, and a metal such as Pd, Pt or Rh, or a mixture of such metals carried thereon. A great many proposals have hitherto been made to obtain catalysts of high activity. For example, Japanese Patent Application laid open under No. 11147/1986 discloses an improvement in the catalyst of the type which comprises a noble metal distributed on particles of $\gamma$-alumina stabilized with an oxide of a rare earth element. The improved catalyst comprises rhodium distributed on particles which are substantially free from any oxide of a rare earth element.

The purifying characteristics of the catalysts which have hitherto been used or proposed, however, depend largely on the air-fuel ratio of the fuel mixture which is employed in an engine. If it is a lean mixture, the catalyst exhibits a high activity of oxidation but a low activity of reduction, as the combustion product contains a large amount of oxygen ($O_2$) On the other hand, the catalyst exhibits a high activity of reduction but a low activity of oxidation, if a rich fuel mixture is employed. The catalyst works most effectively when the fuel mixture has a theoretical air-fuel ratio (A/F=14.6) at which its activities of oxidation and reduction are balanced. In an automobile equipped with an exhaust gas purifier employing a catalyst, therefore, it is usual to detect the amount of oxygen in the exhaust gas and feed back the results to control the air-fuel ratio of the fuel mixture to maintain it at or near the theoretical level which has hereinabove been stated.

The users of automobiles, however, also desire to reduce the consumption of fuel. It is known that their desire can be met if they employ a fuel mixture containing an excess of oxygen during their ordinary travel. If such a lean fuel mixture is employed, however, $O_2$ adsorbed by the catalyst prevents $NO_x$ in the exhaust gas from contacting the active metal on the catalyst and make it difficult to reduce $NO_x$, though HC and CO can be removed by oxidation. Therefore, a catalyst which comprises a transition metal, such as Cu, carried on zeolite by ion exchange has been proposed for use in the purification of exhaust gas from an engine in which a lean fuel mixture is employed.

Zeolites are crystalline aluminosilicates which are represented by the general formula:

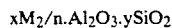

as is well known in the art. There are commercially available many varieties of zeolites characterized by crystal structures having different channels or pore diameters which depend on M (a metal having a valency of n), x and y. They have a high cation exchange capacity, since they have the tendency to retain in the crystals cations, such as $Na^+$ and $K^+$, which make up for the insufficiency of a positive charge which is due to the substitution of $Al^{3+}$ for a part of $Si^{4+}$.

Japanese Patent Application laid open under No. 25250/1985 discloses a catalyst for the catalytic decomposition of nitrogen oxides which contains copper ions in a crystalline aluminosilicate having an appropriate spacing of lattice planes (d value) as determined by X-ray diffraction and having a molar ratio of $SiO_2$:$Al_2O_3$ of 20 to 100:1, and a method of using it.

Japanese Patent Application No. 291258/1987, which was filed by the assignee of the inventors of this invention, proposes a catalyst for the purification of exhaust gas which comprises zeolite ionically exchanged with a transition metal and carried on a refractory support. The preferred transition metals are Cu, Co, Cr, Ni, Fe and Mn. Copper is the most preferable of all.

Zeolites have fine pores with a size of several Ångstrom units which is comparable with the size of a molecule, as they are called molecular sieves. Hydrocarbons are selectively caught in those pores. As the transition metal which has been introduced by ion exchange forms active sites in the pores, the hydrocarbons are adsorbed therein and react with nitrogen oxides. Therefore, it is possible to remove $NO_x$ effectively from even the combustion product of a lean fuel mixture.

However, zeolites are available in a wide variety of types differing in structure from one another and each type of zeolite has a variety of coordination arrangements. Therefore, the performance of a catalyst for purifying exhaust gas depends on the type of zeolite which is employed and its coordination arrangement, even if copper may be employed as the transition metal. No due consideration has hitherto been given to the nature of the active sites in a catalyst for purifying exhaust gas, but all of the known catalysts comprising zeolite and a transition metal have been unsatisfactory in performance.

SUMMARY OF THE INVENTION

Under these circumstances, it is an object of this invention to provide a catalyst for the purification of exhaust gas in which copper is carried on zeolite as a result of ion exchange in such a way as to enable it to exhibit the optimum performance in the purification of exhaust gas.

This object is attained by a catalyst of the type in which zeolite carrying copper as a result of ion exchange is carried on a refractory support, characterized by sites of ion exchange located on the surfaces of supercages of zeolite, and a square arrangement of four oxygen atoms around a copper ion.

The location of the sites of ion exchange and the arrangement of oxygen atoms as hereinabove stated make it possible to obtain a catalyst having a high power of removing nitrogen oxides from exhaust gas if the diameter of the supercages of zeolite is appropriately selected in accordance with the size of hydrocarbon molecules. The catalyst of this invention is particularly useful for purifying the exhaust gas of an engine in which a lean fuel mixture is employed, since it can remove nitrogen oxides therefrom substantially with the same efficiency irrespective of the air-fuel ratio of the lean fuel mixture.

DETAILED DESCRIPTION OF THE INVENTION

Various types of zeolites are known including those which are shown in TABLE 1.

Catalysis, 35, 256–272 (1974). Referring, for example, to ZSM-5, it has a number of advantages over other types of zeolites that are not suitable for use in the production of the catalyst of this invention. It has a high ratio of $SiO_2$ to $Al_2O_3$ and a high acid strength. It comprises rings of 10 oxygen atoms. It contains very little water of crystallization, is hydrophobic and has only a few sites of weak acid.

Figure 1:
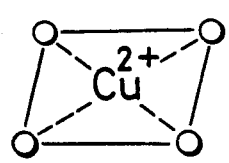
FIG. 1 is a diagram showing a square arrangement of four oxygenatoms around a $Cu^{2+}$ ion.
Figure 2:
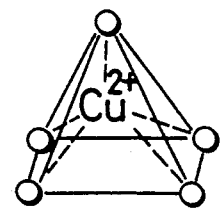
FIG. 2 is a diagram showing a square pyramidal arrangement of five oxygenatoms around a $Cu^{2+}$ ion.

The zeolite is particularly effective if it carries copper ions on the surfaces of its supercages as a result of ion exchange and has a square arrangement of four oxygen atoms around a copper ion. Reference is made to the article of A. V. Kucherov, et al. entitled "$Cu^{2+}$-cation location and reactivity in mordenite and ZSM-5: e.s.r.-study", Zeolites, 5 (September 1985). They made an analysis by ESR of $Cu^{2+}$ and $Cu^0$ found that an independent $Cu^{2+}$ ion would form the central ion in either a square planar arrangement of four oxygen atoms as shown in FIG. 1, or a square pyramidal arrangement of five oxygen atoms as shown in FIG. 2. They also found that the $Cu^{2+}$ ion in the square arrangement of four oxygen atoms was selectively reactive with CO and $O_2$. Based on their findings, we, the inventors of this invention, have succeeded in realizing a catalyst which can efficiently remove $NO_x$ from the exhaust gas of an engine in which a lean fuel mixture is burned.

The highly reactive $Cu^{2+}$ ion in the square planar arrangement of four oxygen atoms is located on the inner surface of the supercage, while the less reactive $Cu^{2+}$ ion forming the square pyramidal arrangement of five oxygen atoms is included in the cage other than the supercage.

TABLE 1

Inlet diameters and network structures of supercages of principal types of zeolites

| Name | Number of atoms forming oxygen rings | Inlet diameter (Å) | Supercage structure | |
|---|---|---|---|---|
| Faujasite (X, Y) | 12 | 7.4 | Three-dimensional | |
| Mordenite | 12 | 6.7 × 7.0 | One-dimensional | connected |
| | 8 | 2.9 × 5.7 | One-dimensional | |
| ZSM-5 | 10 | 5.4 × 5.6 | One-dimensional | connected |
| | 10 | 5.1 × 5.5 | One-dimensional | |
| Offretite | 12 | 6.4 | One-dimensional | connected |
| | 8 | 3.6 × 5.2 | Two-dimensional | |
| Ferrierite | 10 | 4.3 × 5.5 | One-dimensional | connected |
| | 8 | 3.4 × 4.8 | One-dimensional | |
| Erionite | 8 | 3.6 × 5.2 | Three-dimensional | |
| Zeolite A | 8 | 4.1 | Three-dimensional | |
| Chabazite | 8 | 3.6 × 3.7 | Three-dimensional | |

ZSM-5 and ferrierite are examples of the zeolites which can be employed for producing the catalyst of this invention. ZSM-5 is described in, for example, the article of G. T. Kokotailo, S. L. Lawton and D. H. Olson entitled "Structure of Synthetic Zeolite ZSM-5", Nature, Vol 272, page 437 (Mar. 30, 1978). For ferrierite, reference is made by way of example to the article of R. Gramlich-meier, W. M. Meier and B. K. Smith entitled "On faults in the framework structure of zeolite ferrierite", Zeitschrift fur Kristallographie, 169, 201–210 (1984) and the article of C. L. Kibby, A. J. Perrotta and F. E. Massoth entitled "Composition and Catalytic Properties of Synthetic Ferrierite", Journal of The catalyst of this invention can be produced by an ion exchange process. Various techniques including the cubic enlargement of an anion, the restriction of dissociation (acid strength of anion) and the acceleration of ion exchange are employed for the selective introduction of the $Cu^{2+}$ ion forming the square planar arrangement of four oxygen atoms.

The refractory support which constitutes the catalyst of this invention may, for example, be of a ceramic material such as cordierite, or a metal. The amount of zeolite with which the refractory support is coated, and the size and shape of the support depend on the properties which are required of the catalyst.

The catalyst of this invention can, of course, be used in combination with any other type of catalyst for purifying exhaust gas.

Although no details of the mechanism which enables the catalyst of this invention to remove $NO_x$ are known as yet, it is probably due to the reaction of $NO_x$, HC and $O_2$, insofar as the experiments conducted by employing model gases have revealed that the reduction activity of $NO_x$ varies with the HC which the gas contains (e.g. is higher when it contains $C_3H_6$, than when $C_3H_8$), and is improved by a small amount of oxygen. The reactions as shown at A and B are, for example, probable:

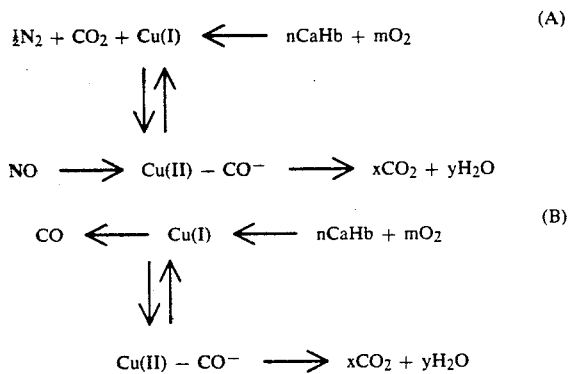

The invention will now be described more specifically with reference to a few examples thereof and a comparative example. It is, however, to be understood that the following description is not intended to limit the scope of this invention.

EXAMPLES 1 TO 3 AND A COMPARATIVE EXAMPLE

Ion Exchange Process

A monolithic support formed from cordierite was coated with ZSM-5 or ferrierite by a wash coating method. Then, it was dipped in a copper salt solution and after the solution had been stirred, the support was removed from the solution. It was fully washed with water, dried, and baked at a temperature of 500° C. to 700° C. in the presence of air. Various catalysts were prepared by employing different conditions as shown in TABLE 2 below.

TABLE 2

Catalysts for Purifying Exhaust Gas

| | Copper salt solution (M) | Dipping time (h) | Ratio of 4 co-ordination $Cu^{2+}$ (%) | Measures*[1] taken |
|---|---|---|---|---|
| Example 1 | Copper acetate (0.05) | 24 | 66 | (1) + (2) |
| Example 2 | Copper acetate (0.05) Ammonia (pH 11) | 3 | 81 | (1) + (2) + (3) |
| Example 3 | Copper propionate (0.001) | 24 | 70 | (1) + (2) |
| Comparative Example | Copper nitrate (0.05) | 24 | 54 | — |

*[1]The measures taken were:
(1) The cubic enlargement of an anion;
(2) The restriction of dissociation (acid strength of anion); and
(3) The acceleration of ion exchange.

Figure 3:
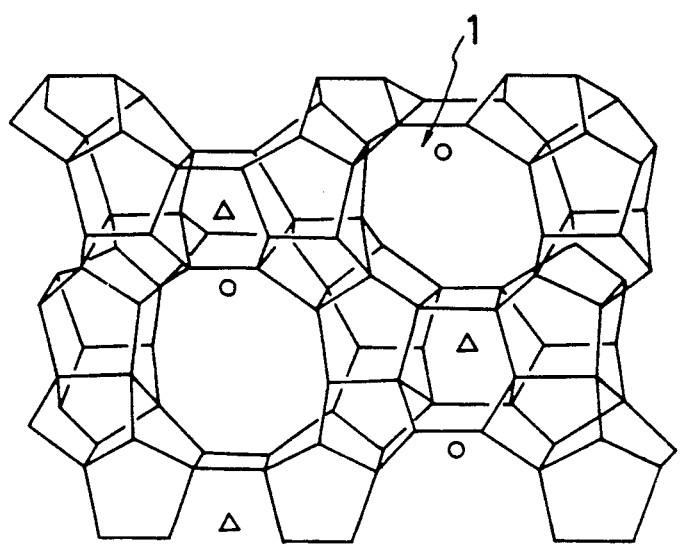
FIG. 3 is a view showing the locations of $Cu^{2+}$ ions introduced by ion exchange into ZSM-5.
Figure 4:
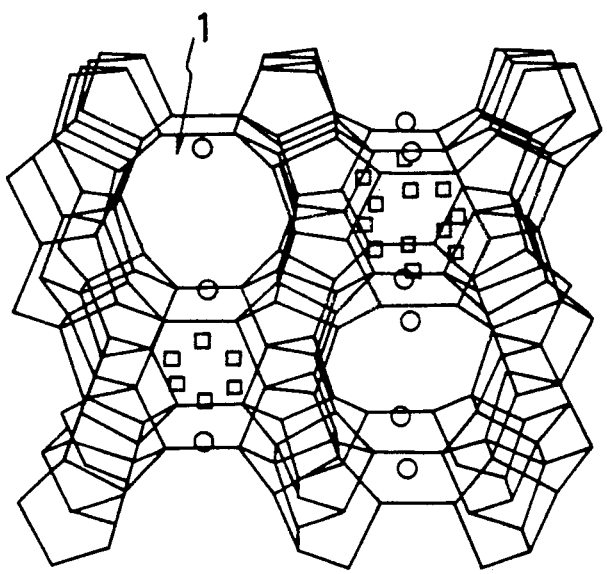
FIG. 4 is a view showing the locations of $Cu^{2+}$ ions introduced by ion exchange into ferrierite.
Figure 5:
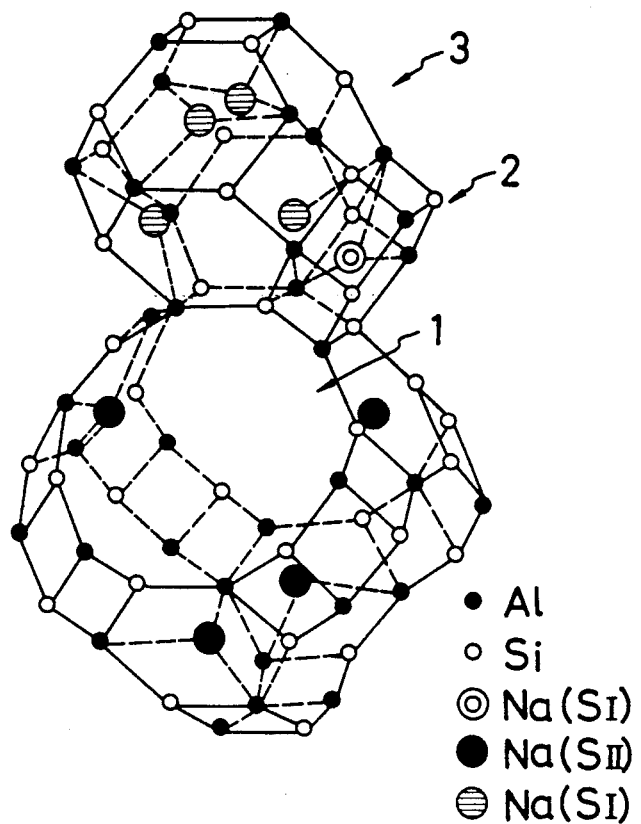
FIG. 5 is a view showing the structure of faujasite.

The sites of $Cu^{2+}$ ions introduced by ion exchange in the 100 face of ZSM-5 are shown by circles and triangles in FIG. 3. Each circle shows the $Cu^{2+}$ ion located in a square planar arrangement of four oxygen atoms, while each triangle shows the $Cu^{2+}$ ion in a square pyramidal arrangement of five oxygen atoms. The sites of $Cu^{2+}$ ions introduced in the 001 face of ferrierite are shown by circles and squares in FIG. 4. Each circle shows the $Cu^{2+}$ ion located in a square arrangement of four oxygen atoms in a supercage, while each square shows the $Cu^{2+}$ ion located in any other arrangement of four oxygen atoms. The structure of faujasite is shown in FIG. 5 for the sake of comparison. The sites of the cations introduced by ion exchange are shown as $Na(S_I)$, $Na(S_{I'})$ and $Na(S_{II})$. No cation forming a planar arrangement of four oxygen atoms exists on the surface of any supercage of faujasite.

The catalysts embodying this invention were tested for performance in the purification of exhaust gas under the following conditions:

Engine: 4A-ELU, LCS; 2000 rpm × 3 kgm (basically);

Catalyst: Manifold type 7R, 300 cells/inch, coated with 138 g of ZSM-5 per liter;

Analysis: A MEXA-2400 analyzer (made by Horiba Seisakusho) and a heated $NO_x$ meter (made by Yanamoto Seisakusho and having a sampling line heated to 120° C. to avoid the adsorption of $NO_x$).

Figure 6:
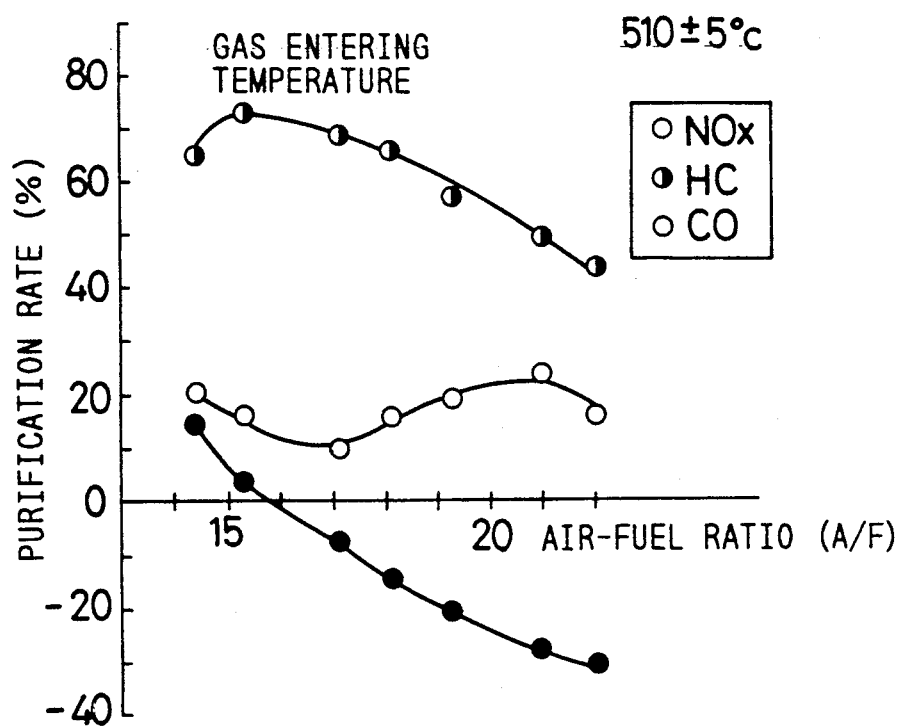
FIG. 6 is a graph showing the ratios of removal of $NO_x$, HC and CO by a catalyst embodying this invention in relation to the air-fuel ratio of a fuel mixture.
Figure 7:
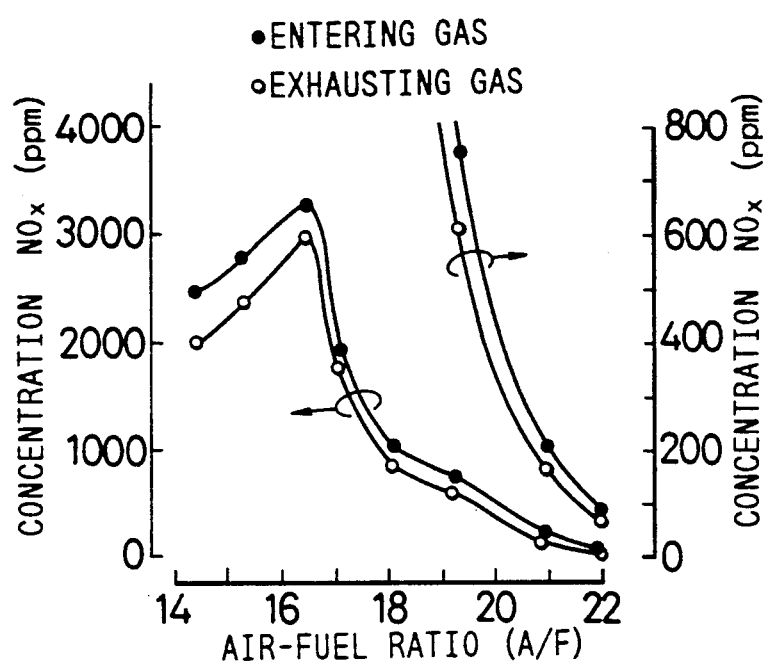
FIG. 7 is a graph showing the concentrations of $NO_x$ in the gas entering the catalyst of this invention and the gas leaving it in relation to the air-fuel ratio of the fuel mixture.
Figure 8:
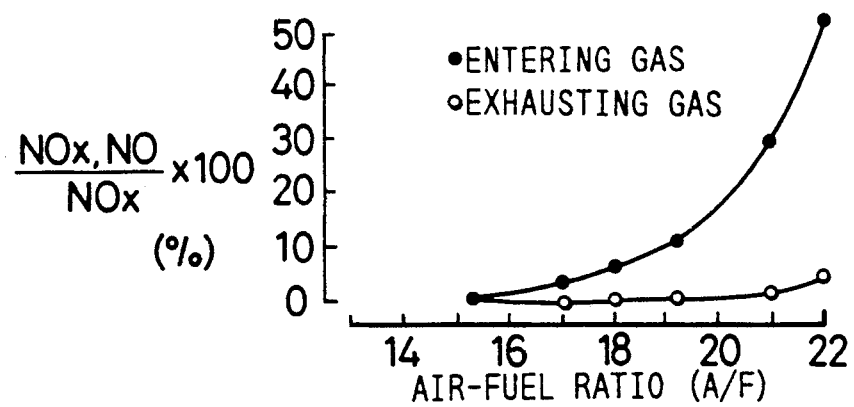
FIG. 8 is a graph showing the percentages of $(NO_x-NO)/NO_x$ in the gas entering the catalyst of this invention and the gas leaving it in relation to the air-fuel ratio of the fuel mixture.
Figure 9:
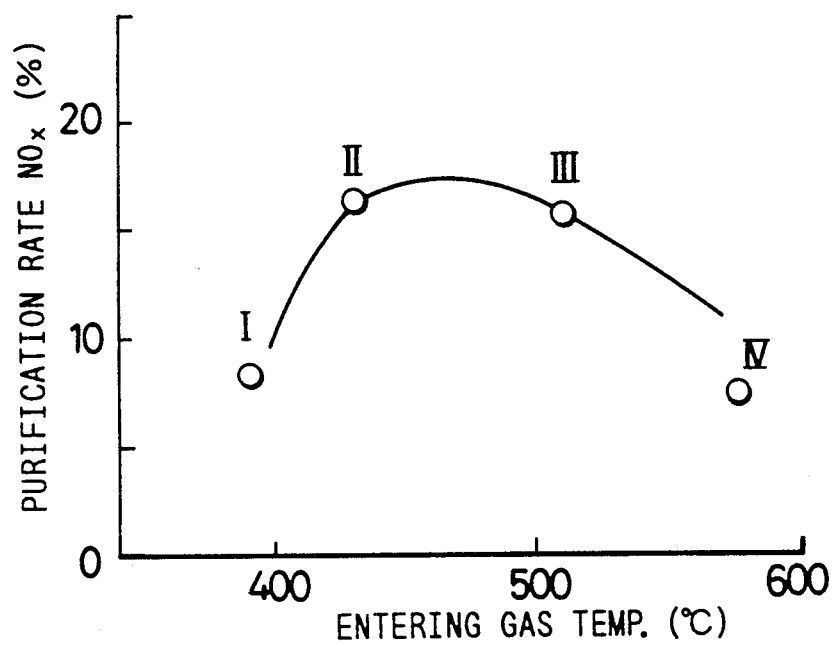
FIG. 9 is a graph showing the ratio of $NO_x$ removal by the catalyst of this invention in relation to the temperature of the gas entering it.

The results are shown in FIGS. 6 to 9. There was no output difference between the MEXA-2400 analyzer and the $NO_x$ meter. The gas leaving the catalyst had a higher CO concentration than the gas entering it, as is obvious from FIG. 6. This means that HC had formed a large amount of CO. The ration of HC removal did not substantially vary with the air-fuel ratio of a lean fuel mixture, but remained in the neighborhood of 60%, as shown in FIG. 6. The ratio of $NO_x$ removal was also substantially constant in the neighbor hood of 20%, as is obvious from FIGS. 6 and 7. FIG. 8 shows that, though the ration of $NO_x$-NO ($\approx NO_2$) in the entering gas increased with an increase in the air-fuel ration of the lean fuel mixture, the same ration in the leaving gas stayed at a very low level, and confirms that the exhaust gas was effectively purified. The ration of $NO_x$ removal reached a peak when the entering gas had a temperature of about 450° C., as shown in FIG. 9. In FIG. 9, I to IV shows the results which were obtained under the following conditions:

I: 1000 rpm × 3 kgm, A/F (air-fuel ratio) = 21.8, entering gas containing 180 ppm of $NO_x$ and 6300 ppm of HC;

II: 1400 rpm × 3 kgm, A/F = 22.2, entering gas containing 146 ppm of $NO_x$ and 6130 ppm of HC;

III: 2000 rpm × 3 kgm, A/F = 22.0, entering gas containing 82 ppm of $NO_x$ and 6000 ppm of HC; and IV: 2600 rpm × 3 kgm, A/F = 19.0, entering gas containing 770 ppm of $NO_x$ and 2620 ppm of HC.

What is claimed is:

1. In the method of producing an exhaust gas purification catalyst comprising a zeolite carried on a refractory support and containing copper introduced thereinto by ion exchange so that said zeolite carries copper ions on the surfaces of its super-cage and has a square arrangement of four oxygen atoms around a copper ion, the improvement which comprises dipping said zeolite in a mixed solution of a copper carboxylate and ammonia to cause said ion exchange to take place.

2. The method of claim 1, wherein said zeolite is of the type selected from among ZSM-5 and ferrierite.

3. The method of claim 2, wherein said zeolite is ZSM-5.

4. The method of claim 1, wherein said support is of a material selected from among ceramics and metals.

5. The method of claim 1, wherein said support is monolithic.

6. The method of claim 5, wherein said monolithic support is of cordierite.

7. A method for introducing copper in to a zeolite by ion exchange so that said zeolite raises copper ions on the surfaces of its super-cage and has a square arrangement of four oxygen atoms around a copper ion, which method comprises immersing said zeolite in a mixed solution of a copper carboxylate and ammonia to cause the ion exchange to take place.

8. The method of claim 7, wherein said zeolite is of the type selected from ZSM-5 and ferrierite.

9. The method of claim 8, wherein said zeolite is ZSM-5.

* * * * *

UNITED STATES PATENT AND TRADEMARK OFFICE
CERTIFICATE OF CORRECTION

PATENT NO.  : 5,017,538
DATED       : May 21, 1991
INVENTOR(S) : Shinichi Takeshima It is certified that error appears in the above-identified patent and that said Letters Patent is hereby corrected as shown below:

Column 3, line 6, change "oxygenatoms" to --oxygen atoms--.

Column 3, line 8, change "oxygenatoms" to --oxygen atoms--.

Claim 7, column 7, line 9, change "in to" to --into--.

Signed and Sealed this

Eighth Day of December, 1992

*Attest:*

DOUGLAS B. COMER

*Attesting Officer*    Acting Commissioner of Patents and Trademarks